United States Patent
Min et al.

(10) Patent No.: US 12,067,975 B2
(45) Date of Patent: *Aug. 20, 2024

(54) VOICE COMMAND DETECTION AND PREDICTION

(71) Applicant: Comcast Cable Communications, LLC, Philadelphia, PA (US)

(72) Inventors: Rui Min, Vienna, VA (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,644

(22) Filed: Apr. 18, 2023

(65) Prior Publication Data

US 2023/0386454 A1  Nov. 30, 2023

Related U.S. Application Data

(63) Continuation of application No. 16/287,666, filed on Feb. 27, 2019, now Pat. No. 11,657,801.

(51) Int. Cl.
| | |
|---|---|
| *G10L 15/16* | (2006.01) |
| *G06N 20/00* | (2019.01) |
| *G10L 15/22* | (2006.01) |
| *G10L 15/30* | (2013.01) |

(52) U.S. Cl.
CPC ............... *G10L 15/16* (2013.01); *G06N 20/00* (2019.01); *G10L 15/22* (2013.01); *G10L 15/30* (2013.01); *G10L 2015/223* (2013.01)

(58) Field of Classification Search
CPC ......... G10L 15/16; G10L 15/22; G10L 15/30; G10L 2015/223; G06N 20/00

USPC .......................................................... 704/232
See application file for complete search history.

(56) References Cited

U.S. PATENT DOCUMENTS

| | | |
|---|---|---|
| 9,111,214 B1 | 8/2015 | Sharma et al. |
| 10,127,918 B1 | 11/2018 | Kamath et al. |
| 10,185,544 B1 | 1/2019 | Mutagi et al. |
| 10,453,117 B1 | 10/2019 | Reavely et al. |
| 10,671,076 B1 | 6/2020 | Kobilarov et al. |
| 11,043,214 B1 | 6/2021 | Hedayatnia et al. |
| 11,657,801 B2 * | 5/2023 | Min .................. G10L 15/30 704/232 |
| 2015/0170652 A1 | 6/2015 | Kaplan et al. |
| 2017/0221486 A1 | 8/2017 | Kurata et al. |
| 2017/0334066 A1 | 11/2017 | Levine et al. |
| 2019/0079788 A1 | 3/2019 | Ruty et al. |
| 2020/0126232 A1 | 4/2020 | Guo et al. |

\* cited by examiner

*Primary Examiner* — Susan I McFadden
(74) *Attorney, Agent, or Firm* — BakerHostetler (57) ABSTRACT

Methods, systems, and apparatuses for predicting an end of a command in a voice recognition input are described herein. The system may receive data comprising a voice input. The system may receive a signal comprising a voice input. The system may detect, in the voice input, data that is associated with a first portion of a command. The system may predict, based on the first portion and while the voice input is being received, a second portion of the command. The prediction may be generated by a machine learning algorithm that is trained based at least in part on historical data comprising user input data. The system may cause execution of the command, based on the first portion and the predicted second portion, prior to an end of the voice input.

20 Claims, 6 Drawing Sheets

VOICE COMMAND DETECTION AND PREDICTION

CROSS REFERENCE TO RELATED APPLICATIONS

This application is a continuation of U.S. patent application Ser. No. 16/287,666, filed Feb. 27, 2019, now U.S. Pat. No. 11,657,801 issued May 23, 2023, which is hereby incorporated by reference in its entirety.

BACKGROUND

Voice recognition systems and devices configured to receive and respond to voice queries are becoming increasingly common. A voice query may be, for example, a spoken command to a device to perform some action, a spoken request to view or play some particular content, a spoken request to search for certain content or information based on search criteria, or any other spoken request or command. By removing the need to use buttons and other modes of selection, such devices may be controlled by a user in a hands-free manner, for example, by the user speaking a wake-up phrase, and allowing the user to issue voice queries while performing other tasks.

Some voice recognition systems rely on a user indication such as a button release event to indicate the end of speech. Once the voice button is released, a voice signal may be sent to the voice recognition system. During this process, the user may be required to continuously hold the voice button. Other example voice recognition systems implement a pseudo conversation system, where a user command starts with a triggering word or a guard word, and the end of each vocalized request is detected by a short period of silence (e.g., one second). At the end of the query/request, the service executes the command and responds to the user's request.

However, when such systems attempt to capture audio for the purpose of speech recognition (or verbal communication), there are latencies in recognizing and executing the spoken commands. These types of voice-based engines are resource intensive and require a large amount of backend resources. As a result of the resources required to process commands using these systems, users often experience long delays in receiving responses. Furthermore, the extra silence period (delay) required for some systems for end of command detection adds further delay. For example, if a user is comfortable receiving a response from the recognition engine within 1 second, then assuming the end of command detection takes 400 ms, then the time budget for the rest of the operations of the entire service is only 600 ms. Other systems stream audio from the user device to a backend, wait for the automatic speech recognition result, perform natural language processing, and then send the response to the originating device. Even if the request is processed immediately after the end of the request without end of command detection (e.g., based on the user releasing a record button as the end of command), the end to end delay for response may be 2 to 3 seconds. Furthermore, if two seconds of silence is used to detect the end of a command, the end result is that the user may need to wait for 4-5 seconds for response to a spoken command, resulting in a poor user experience. Yet another problem is that when there is heavy traffic at the backend, for example during peak usage times, further delays may be introduced in the response time. Additionally, to ensure proper operation in live environment, additional resources may be needed for such services, such as local voice training, a local acoustic profile for each user, etc. This not only adds complexity but also cost to providing the service. Such services may find the envelop of sound, but there is a difference between the end of sound and the end of voice command, especially in a noisy environment when, for example, multiple people are talking or when a television program is being played. Accordingly, there is a need for a method and apparatus for reducing these latencies and resource demands in voice recognition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods, systems, and apparatuses for predicting an end of a command in a voice recognition input are described herein. In accordance with one embodiment, a system may receive data comprising a voice input. The system may receive a signal comprising a voice input. The system may detect, in the voice input, data that is associated with a first portion of a command. The system may predict, based on the first portion and while the voice input is being received, a second portion of the command. Alternatively, the second portion of the command may be predicted as reception of the voice input ends or slightly after reception of the voice input. The prediction may be generated by a machine learning algorithm that has been trained based at least in part on historical data comprising user input data. The system may cause execution of the command, based on the first portion and the predicted second portion. The execution of the command may be performed prior to an end of the voice input, at the same time as the end of the voice input, or slightly after the end of the voice input.

Other features of the methods, systems, and apparatuses are described below. The features, functions, and advantages can be achieved independently in various examples or may be combined in yet other examples, further details of which can be seen with reference to the following description and drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Methods, apparatuses, and systems are described herein in accordance with various embodiments for an end-of-command detection system that provides a natural user experience while avoiding long delays. Furthermore, such methods and systems may be suitable for platform environments with limited resources.

The various embodiments described herein provide a more convenient and natural voice activation interface to end users than the systems described above. For example, once voice control is activated, the system may leave the connection between the user and the device active and open throughout time periods of possible interaction so that a user need not hold the voice button. The various embodiments described herein may automatically detect when the user has completed a voice command, such that the command may be executed with minimal delay, and so that the system may wait for the next command to be detected.

Users of systems such as television systems typically do not speak random sentences. Instead, the requests usually follow specific patterns. For example, a common phrase in a home entertainment environment may be "tune to" a certain network or channel. When the phrase "tune to" is recognized, it may be assumed that a network name or channel number will follow. Furthermore, the network name or channel number is likely to be the end of the voice command. With time and location information, a prediction of the end of the command may be further refined. Connections between a plurality of commands may also be formed. For example, the command "show me all kid's movies" is likely to be followed by one or more navigational commands. A prediction of the one or more navigational commands may be made following the command, "show me all kid's movies."

In the embodiments described herein, a machine learning engine may be used to learn these patterns behind possible user commands (e.g., from historical data), and accurately predict if the current command has already been completed, or what the next command is likely to be. For example, a long short term memory (LSTM) network may be used to predict the end of a command. An LSTM network is variation of a Recurrent Neural Network (RNN), which is trained using Backpropagation Through Time and overcomes the vanishing gradient problem. However, instead of using neurons as in an RNN, LSTM networks comprise memory blocks that are connected through layers. LSTM networks are explicitly designed to avoid the long-term dependency problem, and they may be used in natural language processing (NLP) and time series modelling.

As a result of the machine learning engine of the embodiments described herein, a true natural conversation recognition service is provided such that, once the device is activated by its associated triggering words, the commands that follow do not need to have the triggering words. Instead of sending one request after another, the user is actually in conversation with the device, resulting in a much more natural user experience.

Figure 1:
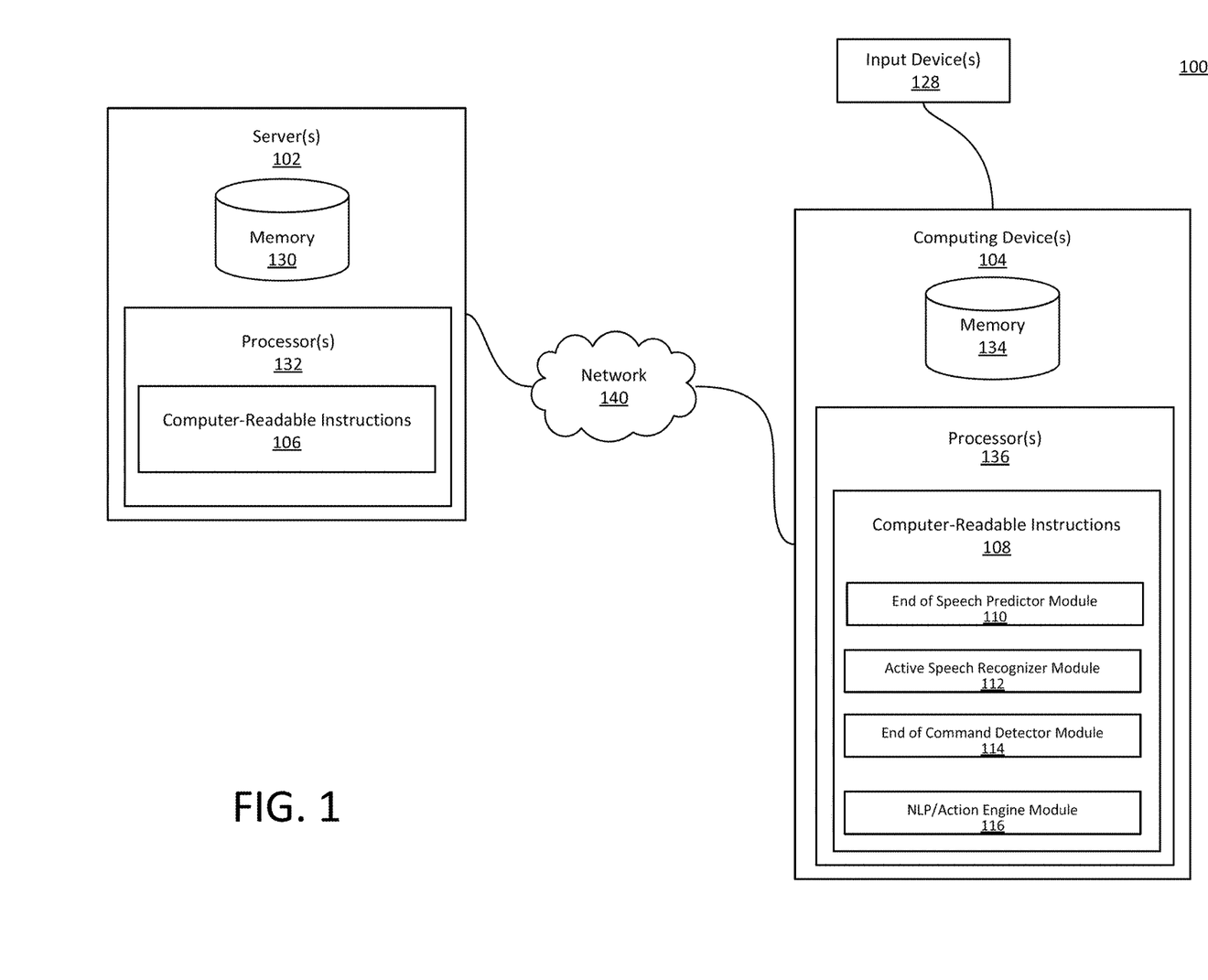
FIG. 1 illustrates a diagram of a high-level example system configured for determining an end-of-command of a voice recognition input.

FIG. 1 illustrates a diagram of an example high-level system 100 configured for determining an end-of-command of a voice recognition input, in accordance with one or more embodiments. In the example of FIG. 1, the system 100 may comprise one or more computing device(s) 104. Computing device(s) 104 may be configured to communicate with one or more server(s) 102. Computing device(s) 104 may be configured to communicate with other computing devices via server(s) 102 and/or according to a peer-to-peer architecture and/or other architectures. Users may access system 100 via computing device(s) 104. Computing device(s) 104 may be associated with input device(s) 128.

Server(s) 102, computing device(s) 104, and/or input device(s) 128 may comprise transmitters, receivers, and/or transceivers enabling the server(s) 102, computing device(s) 104, and/or input device(s) 128 to be operatively linked via one or more electronic communication links. For example, such electronic communication links may be established, at least in part, via a network 140 such as the Internet and/or other networks. The electronic communication links may enable wired or wireless communications among the server(s) 102, computing device(s) 104, and/or input device(s) 128 using technologies such as coaxial cable, Ethernet, fiber optics, microwave, satellite, Public Switched Telephone Network (PTSN), DSL (Digital Subscriber Line), Broadband over Power Lines (BPL), WLAN technology such as Institute of Electrical and Electronics Engineers (IEEE) 802.11 technology, wireless cellular technology, Bluetooth, or any other appropriate technologies. It will be appreciated that the example system 100 of FIG. 1 is not intended to be limiting, and that the scope of this disclosure includes implementations in which server(s) 102, computing device(s) 104, and/or input device(s) 128 may be operatively linked via some other communication media.

Server(s) 102 may be configured by computer-readable instructions 106. Computer-readable instructions may comprise one or more instruction modules. The instruction modules may comprise computer program modules. Processor(s) 132 may be configured to execute the computer-readable instructions 106 and perform the procedures in accordance with the embodiments described herein. By way of non-limiting example, the server 102 may comprise any system that is programmed to transmit or access content consistent with the description herein, and may be, for example, a video/audio server, a content delivery network (CDN), a cable head end, or any other suitable system or other computing platform. Server(s) 102 comprise memory 130, and one or more processors 132, and/or other components. Server(s) 102 may comprise communication interfaces, lines, or ports to enable the exchange of information with network 140 and/or other computing platforms. The illustration of server(s) 102 in FIG. 1 is not intended to be limiting. Server(s) 102 may comprise a plurality of hardware, software, and/or firmware components operating together to provide the functionality attributed herein to server(s) 102. For example, server(s) 102 may be implemented by a cloud of computing platforms operating together as server(s) 102. The memory 130 may comprise non-transitory storage media that electronically stores information, such as, for example, the computer-readable instructions 106. Processor(s) 132 may be configured to provide information processing capabilities in server(s) 102.

Computing device(s) 104 may comprise an end-of-command prediction system, in accordance with the various embodiments described herein, that comprises a machine learning engine, such as an LSTM network comprising a plurality of memory blocks, configured for voice recognition and end-of-command prediction. Computing device(s) 104 may comprise memory 134, and one or more processors 136, and/or other components. Computing device(s) 104 may be configured by computer-readable instructions 108. Computer-readable instructions 108 may comprise one or more instruction modules. The instruction modules may comprise computer program modules associated with the machine learning algorithms. The instruction modules may comprise one or more of an end-of-command predictor module 110, an active speech recognizer module 112, an end of command detector module 114, and an NLP/Action engine module 116. Processor(s) 136 may be configured to execute the computer-readable instructions 108, respectively and perform the procedures in accordance with the embodiments described herein. By way of non-limiting example, the computing device 104 may comprise one or more of a set-top box, a wireless gateway, a desktop computer, a laptop computer, a handheld computer, a tablet computing platform, a netbook, a smartphone, a gaming console, and/or other computing platforms. Computing device(s) 104 may comprise communication interfaces, lines, or ports to enable the exchange of information with network 140 and/or other computing platforms. The illustration of computing device(s) 104 in FIG. 1 is not intended to be limiting. Computing device(s) 104 may comprise a plurality of hardware, software, and/or firmware components operating together to provide the functionality attributed herein to computing device(s) 104. For example, computing device(s) 104 may be implemented by a cloud of computing platforms operating together as computing device(s) 104. The memory 134 may comprise non-transitory storage media that electronically stores information, such as, for example, the computer-readable instructions 108. The memory 134 may comprise a plurality of memory blocks of a machine learning engine. Processor(s) 136 may be configured to provide information processing capabilities in computing device(s) 104.

Input device(s) 128 may comprise sources of user inputs such data indicative of a voice input. By way of non-limiting example, an input device 128 may comprise one or more of a microphone, a cable set-top box remote control, an internal microphone of computing device 104, or any other device capable of receiving a user input such as a voice command and capable of communicating with computing device 104. For example, an input device 128, which is in communication with an end-of-command prediction system of a computing device 104, may receive a voice query from a user. In this example, the input device 128 may be configured to transmit (e.g., streams, file transfers, etc.) audio data of the voice query to the machine learning engine of the computing device 104 where it may be processed to determine the meaning of words in the voice query. The machine learning engine of the computing device 104 may also stream the audio data to a server 102 capable of performing automated speech recognition and to receive, from the server 102, a transcription of the voice query.

For example, a user may speak a voice query, such as "tune to channel 1," received by an input device 128 such as a cable set-top box control. A microphone in the input device 128 may capture the spoken command in the form of an audio file, and the audio file may be transmitted to the computing device 104, which in this example may comprise a set-top box. The set-top box may forward the audio file to its machine learning engine configured to determine the spoken command and respond accordingly. In some embodiments, a transcription of the audio file, in this example the text "tune to channel 1," may be sent back to the machine learning engine. The machine learning engine may then employ natural language processing techniques, in accordance with the embodiments described herein, to understand the meaning of the text "tune to channel 1."

In this example, the machine learning engine may recognize that the user wishes to tune to channel 1 (or in another example, a particular network associated with channel 1, or programming associated with channel 1). The machine learning engine of the computing device 104 (e.g., the set-top box) may then send a command instructing the computing device 104 (e.g., the set-top box) to tune to channel 1. In another example, the machine learning engine of a first computing device 104 may receive and process the voice query and then may send the command to a second computing device (e.g. a set-top box) to tune to channel 1.

Figure 2:
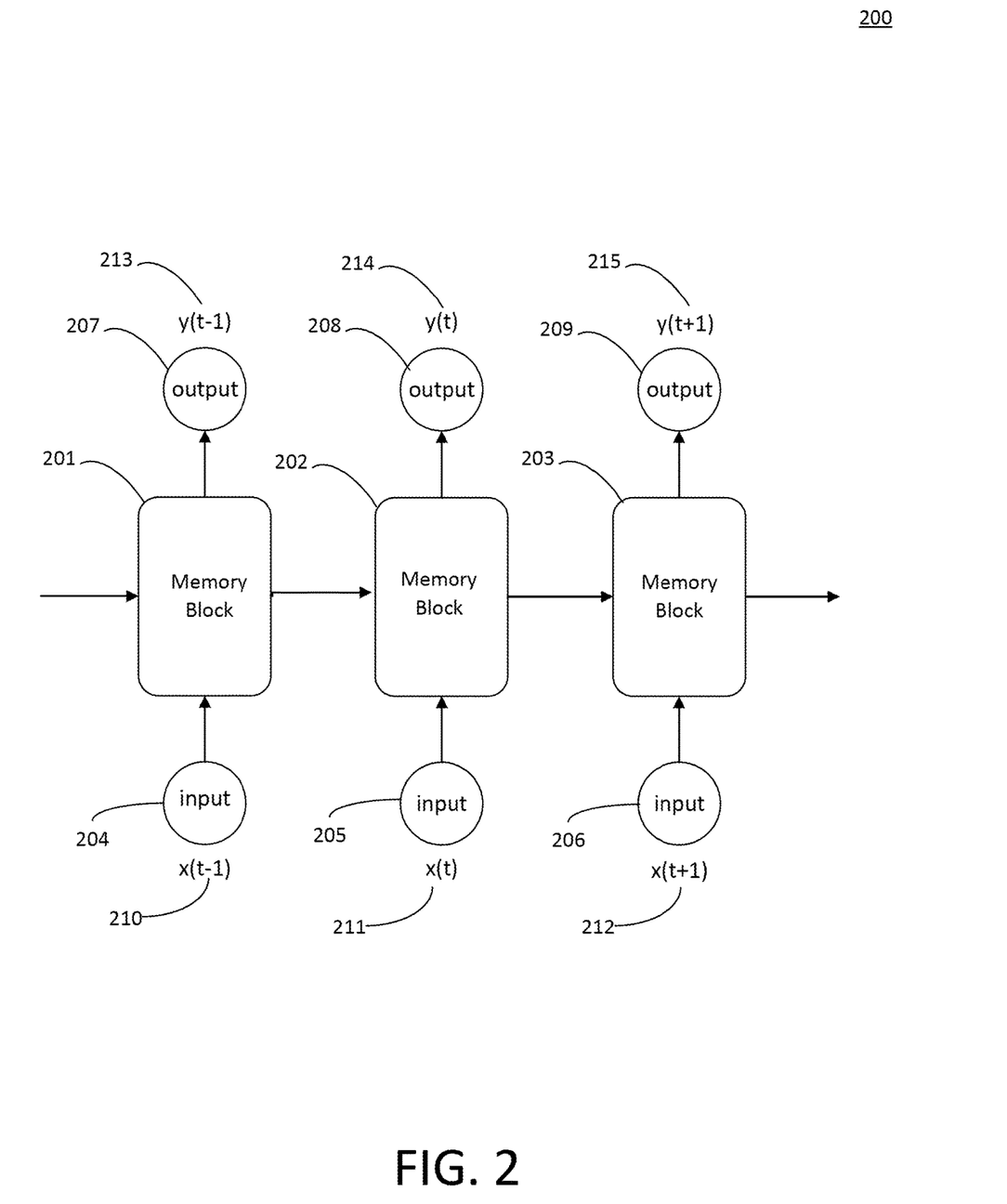
FIG. 2 is a diagram of an example machine learning engine.

FIG. 2 is a diagram of an example machine learning engine 200, which may be used in any of the embodiments described herein. The computing device(s) 104 and/or server(s) 102 may comprise a machine learning engine 200 as shown in FIG. 2. The machine learning engine 200 may comprise an LSTM network or other memory system. The machine learning engine 200 may comprise multiple memory blocks 201, 202, and 203. Each memory block 201, 202, an 203 has a respective input 204, 205, an 206. An input 204, 205, and 206 may be, for example, a history of words. Each memory block 201, 202, and 203 has a respective output 207, 208, and 209. An output 207, 208, and 209 may comprise, for example, a prediction of a word that may comprise a command or a portion of a command. Each input and output are associated with a time instance 210, 211, 212, 213, 214, and 215.

Figure 3:
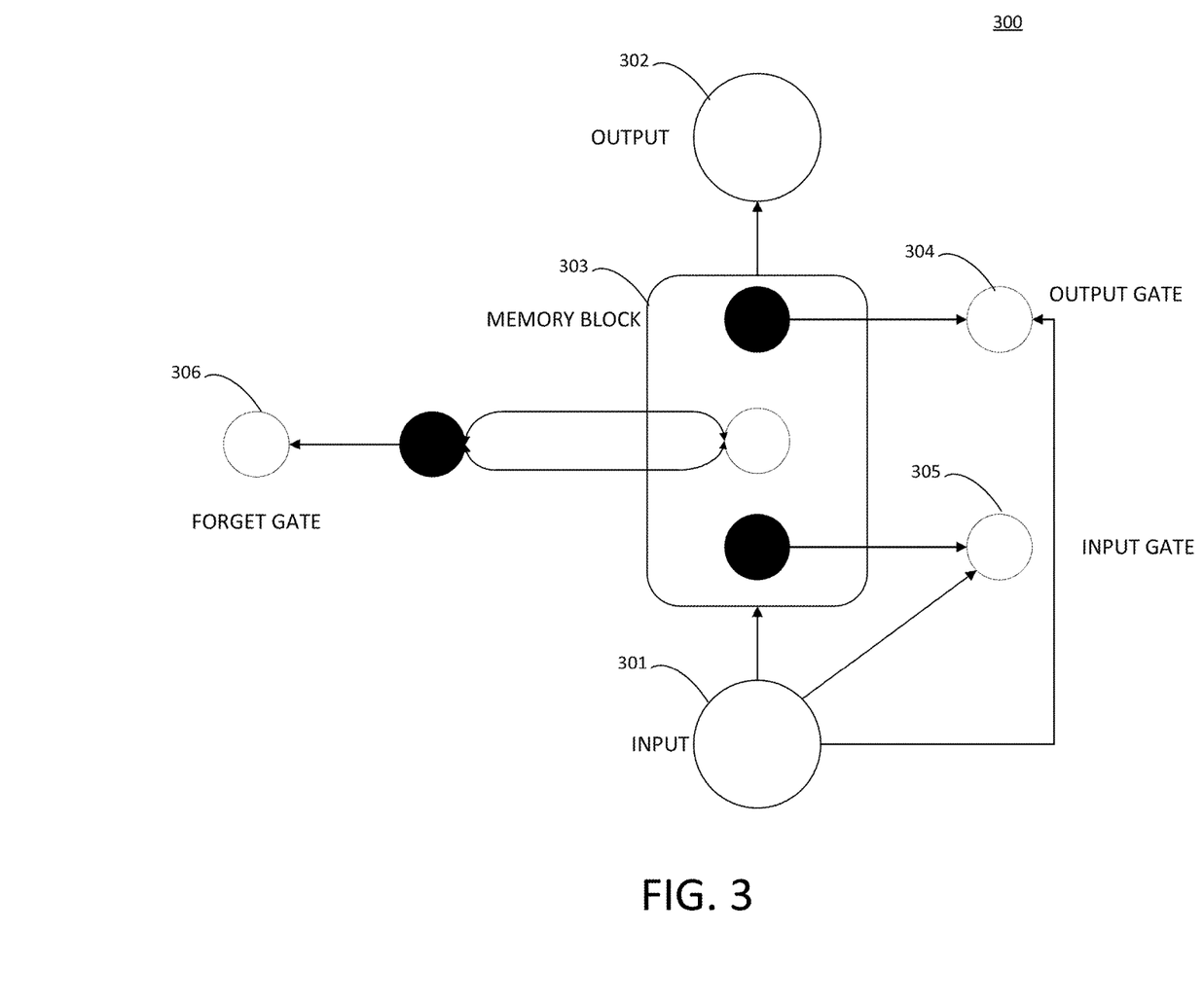
FIG. 3 is a diagram of an example machine learning engine.

FIG. 3 is a diagram of another example machine learning engine 300, which may be used in any of the embodiments described herein. The machine learning engine 200 may comprise one or more machine learning engines 300 as shown in FIG. 3. The machine learning engine 300 may comprise an LSTM network or other memory system. The machine learning engine 300 may comprise an input 301, an output 302, and memory block(s) 303 in place of the familiar hidden unit. Each memory block may have three associated gate units, such as an output gate 304, input gate 305, and forget gate 306. Each layer of machine learning engine 300 may comprise multiple units or memory blocks 303.

In the example of FIG. 3, input gate 305 may learn information from input 301. Output gate 304 may learn how much information to output at output 302. Forget gate 306 may learn how much information has entered the memory block 303 in a last amount of time. In one example, a first layer of weights may be provided from input 301 to memory block 303, input gate 305, output gate 304, and forget gate 306. There may be recurrent connections from one memory block 303 to other memory blocks and gates. Weights may be provided from the memory block(s) 303 to the outputs. The weights are learned for the prediction of commands.

Figure 4:
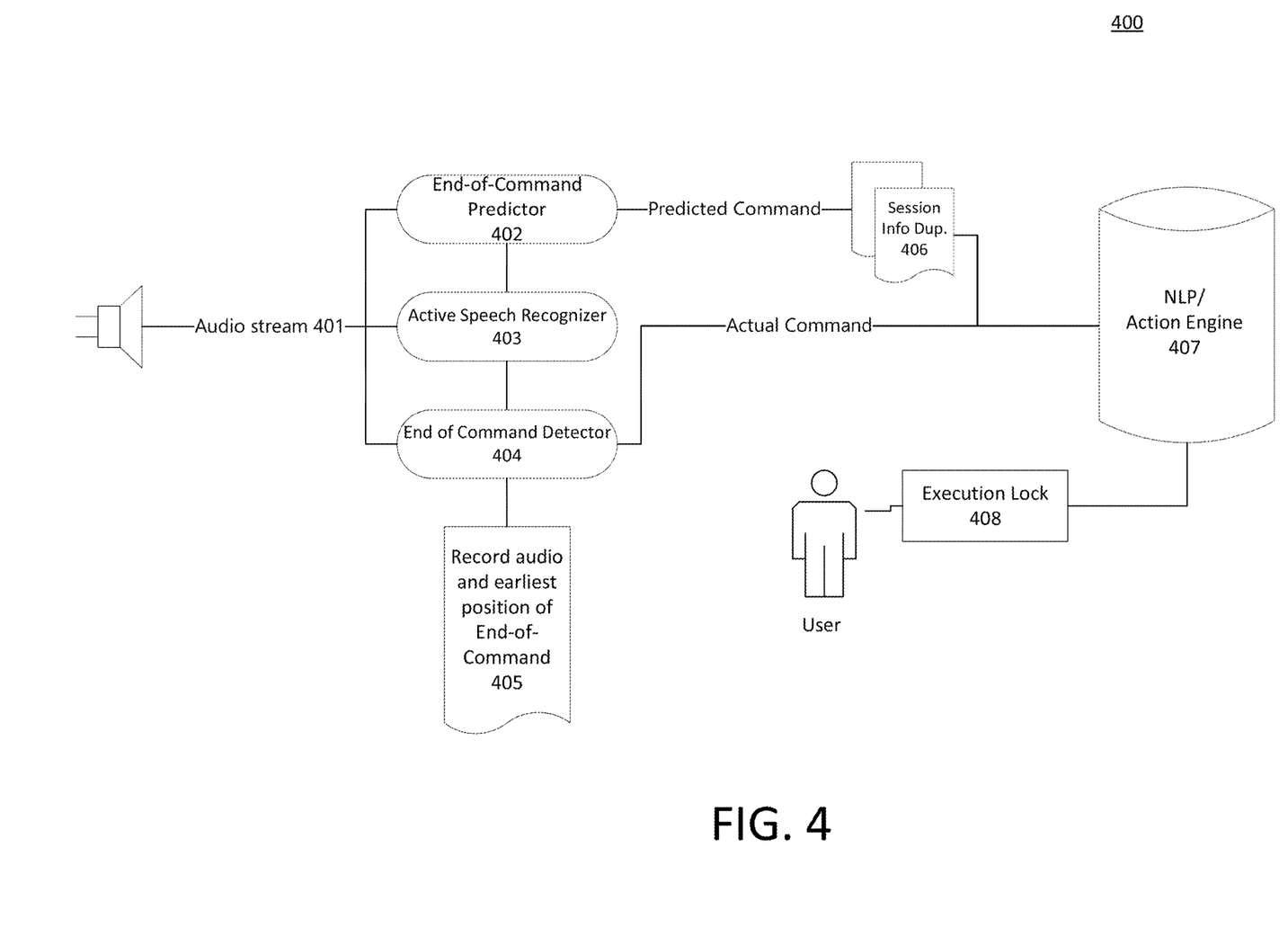
FIG. 4 is a diagram of an example system configured for end-of-command prediction and detection.

FIG. 4 is a diagram of an example system 400 configured for end-of-command prediction and detection, in accordance with one embodiment, which may be used in combination with any of the embodiments described herein. In the example system of FIG. 4, a machine learning algorithm is used to predict the end of a command from a conversation, immediately after or before the user has finished speaking the command. Acoustic features, linguistic features, and historical user patterns may be combined to detect the end of the user's speech or command. The example system 400 may be implemented, for example, in any of the devices or combination of devices depicted in the system 100 of FIG. 1.

Referring to FIG. 4, the system 400 may be configured to receive data indicative of a voice input from an audio stream 401. The audio stream 401 may be sent in parallel to an end-of-command predictor 402, active speech recognizer 403, and end of command detector 404 of the system 400, which enables the backend machine learning algorithm(s) to start processing the audio stream immediately. Based on processing the audio stream 401, the system may detect that first portion of the voice input is associated with a command and may predict a second portion or the end of the command and then process the command without waiting for the rest of the voice input in the audio stream 401 to be processed. The total processing latency may thus be reduced by processing of the command early thereby allowing the processing to overlap with the delay associated with waiting for the full command and with any delay in the user's speaking of the full command.

The active speech recognizer 403 may be configured to recognize speech in the audio stream 401 based on, for example, acoustic features or linguistic features, and may generate transcriptions of the recognized speech. For example, the acoustic features (including the energy level of the audio stream) may be used to detect the end of silence. However, the end of the sound is not always the end of the command. Therefore, the linguistic features of the audio may also be used. If the active speech recognizer 403 detects active audio and cannot generate a transcription of the active audio, the active speech recognizer 403 may determine that the active audio is not associated with a command. In situations when multiple people are talking from different angles with different volumes, even when there is transcription, it may be possible that the transcription is not part of the voice command. The active speech recognizer 403 may consider the voice command active while confident transcriptions of audio are being produced allowing an accurate detection of the end of speech even in with a noisy and low quality audio environments.

The end-of-command predictor 402 may be configured to detect, based on the data and while the voice input is being received, data associated with a first portion of a command. The end-of-command predictor 402 may predict the second portion of the command (the end of the command) to generate a predicted command. The prediction of the end of the command may be generated based in part on common input commands and historical data. By way of a non-limiting example, the prediction may be generated based on acoustic features and/or linguistic features. By way of a non-limiting example, the prediction may be generated based on metadata, time information, location information, or demographic information. By way of another non-limiting example, the prediction may be generated further based on differences between a format of the voice input and formats of previous inputs and based on changes in acoustic features. The end-of-command predictor 402 may be configured to generate inter-command connections between a plurality of detected commands and a plurality of navigational commands.

The end-of-command predictor 402 may comprise a machine learning engine that uses historical user input data (e.g., historical commands) and/or existing knowledge to predict if a current command has already been completed or what the next command is likely to be and then to generate a prediction of the end of the current command or a prediction of the next command. For example, the machine learning engine may study historical data and determine that the command, "next page" has recently become a very popular short command with no following contents. Then, if the end-of-command predictor 402 detects "next page", then it may instantly determine that "next page" is with a high probability the end of a command and action may be taken. The end-of-command predictor 402 may use the historical user input data (e.g., historical commands) to train a machine learning algorithm of the machine learning engine.

The machine learning engine of the end-of-command predictor 402 may comprise a LSTM network used to predict the end of a command. The LSTM network may be configured to learn relationships between commands and their associated actions (e.g., "tune to," "watch," "find," etc.) and entities with temporal dependencies. The LSTM network may be configured to predict whether a voice query is complete or predict any additional words that a user may speak. For example, after a user speaks a word, the LSTM network may be configured to predict (1) if there are any more words to predict; (2) what are the possible, next words the user may speak, if any. If there are no more spoken words after the last spoken words(s), the LSTM network may determine that the command is complete. For example, the LSTM network may be configured to determine whether the end of the command has been reached based on detecting a silence cue. If there are more words predicted, the LSTM network may combine the silence cue to make a decision as to whether the end-of-command has been reached. The end-of-command predictor 402 may use available historical commands from a plurality of users to train the LSTM network. In another example, if the format of the command is significantly different from previous inputs, and changes in acoustic features are detected, it may be assumed that the command has ended.

The end-of-command predictor 402 may send the predicted command to the NLP/action engine 407. The NLP/action engine 407 may receive the predicted command from the end-of-command predictor 402 prior to an end of the voice input, at the end of the voice input, or after the voice input. As a result, the NLP/action engine 407 may process the predicted command prior to an end of the voice input or at the end of the voice input, which enables the total processing latency to thus be reduced by processing of the command early thereby allowing the processing to overlap with the delay associated with processing the fully detected command and with any delay in the user's speaking of the full command.

The NLP/action engine 407 may then execute the predicted command. For example, the NLP/action engine 407 may cause a computing device 104 that implements the system 400 (e.g., a set-top box) to tune to a channel requested by the user. In another example, executing the processed predicted command may comprise the NLP/action engine 407 causing the computing device 104 that implements the system 400 to send a signal based on the detected command to a second computing device, which may cause the second computing device to perform the action requested by the user.

In some embodiments, the system 400 may be configured to execute a lock 408 that is operational to prevent the predicted command from being processed until it is determined whether the predicted command is correct. For example, after a high confidence prediction of the end-of-command is made, the predicted command received from the end-of-command predictor 402 may be processed immediately by the NLP/action engine 407 as described above.

When a mid-confidence prediction is made, a prediction may be made and processed by the NLP/action engine 407, and a revoke mechanism may also be implemented. For example, the revoke mechanism may comprise two steps:
  a copy of the user conversational status is generated and stored 406; and
  a lock 408 is executed to prevent the final results being delivered to the user until it is determined whether the predicted command is correct.

The way the system 400 processes predictions of different confidence levels may be configured.

The end of command detector 404 may detect an end of command in the audio stream 401 or in speech recognition results from the active speech recognizer 403. Once the end of command is detected, the results can be stored 405. In some embodiments, the earliest position of the streaming may be stored 405 as well when the final transcription is generated. This information may be provided to the machine learning engine of the end-of-command predictor 402 to train future models. When the actual end of command detection is done, it is determined whether the predicted command was correct. If so, the results will continue to be sent to the user. Otherwise, original user conversation status is copied, and the correct command may be generated and processed.

If no end-of-command is predicted, the end-of-command predictor 402 may send the newest speech recognition result from the active speech recognizer 403 to the NLP/action engine 407.

The system 400 may be configured to generate and store 406 the data indicative of the voice input and/or store the detected command. The stored data 406 may comprise a copy of the user conversational status (shown as session info dup. in FIG. 4). The system 400 may use the stored data to process a command associated with to restore the system 400 to an earlier condition prior to processing the predicted command when the system 400 determines that the predicted command was incorrect. The system 400 may also use the stored data 406 to train the prediction model (e.g., LSTM network) of the end-of-command predictor 402.

Figure 5:
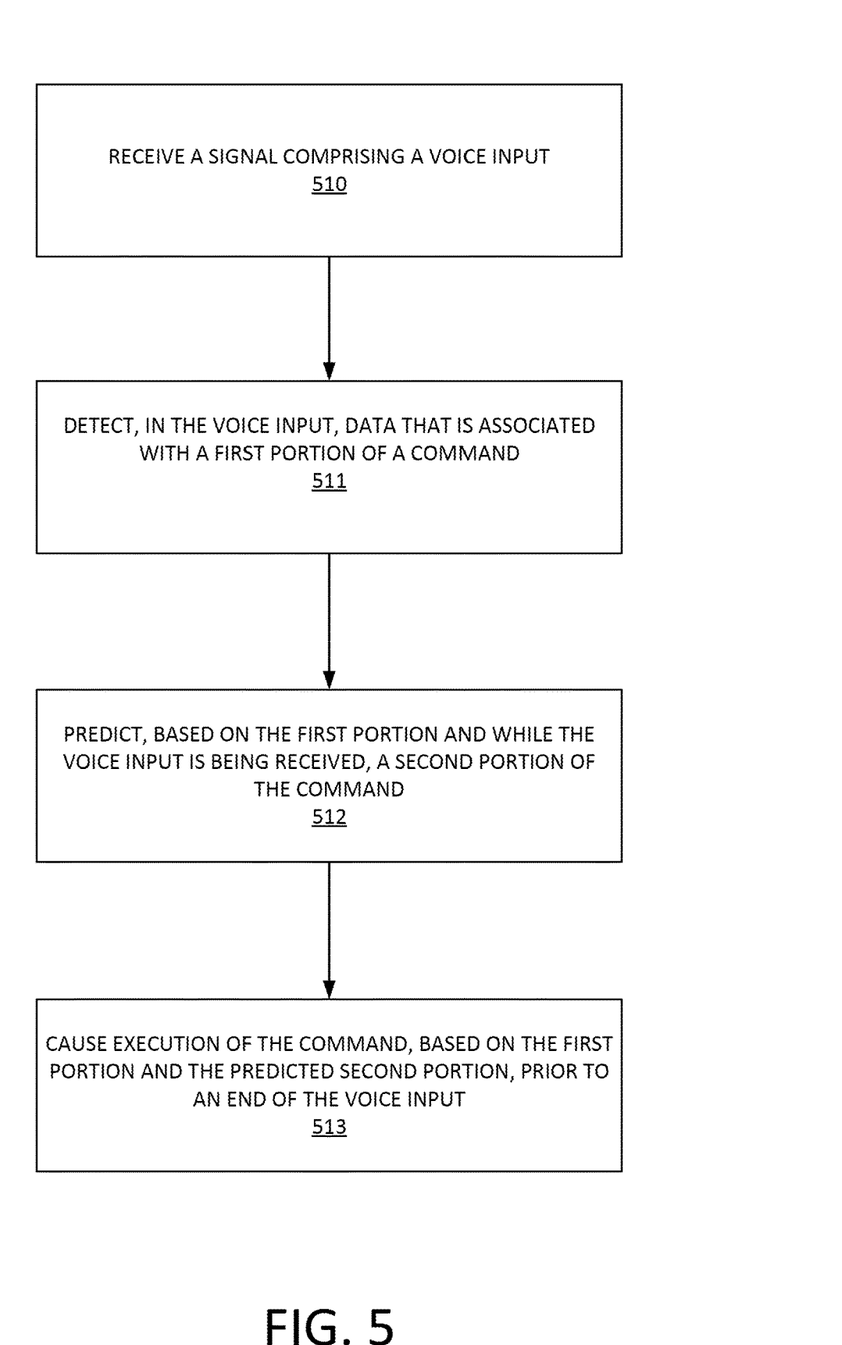
FIG. 5 is a flow diagram of an example procedure for determining an end of command of a voice recognition input.

FIG. 5 is a flow diagram of an example method 500 for determining an end of command of a voice recognition input in accordance one example embodiment. In the example of FIG. 5 one or more computing devices described herein may implement the procedure 500. While each step of the procedure 500 in FIG. 5 is shown and described separately, multiple steps may be executed in a different order than what is shown, in parallel with each other, or concurrently with each other. The computing device may have memory that has stored thereon computer-readable instructions that, when executed, cause the computing device to perform steps as described. Referring to FIG. 5, at step 510, the computing device may receive a signal comprising a voice input. At step 511, the computing device may detect, in the voice input, data that is associated with a first portion of a command. At step 512, the computing device may predict, based on the first portion and while the voice input is being received, a second portion of the command. Alternatively, the second portion of the command may be predicted as reception of the voice input ends or slightly after reception of the voice input. At step 513, the computing device may cause execution of the command, based on the first portion and predicted second portion. The execution of the command may be performed prior to an end of the voice input, at the same time as the end of the voice input, or slightly after the end of the voice input.

Figure 6:
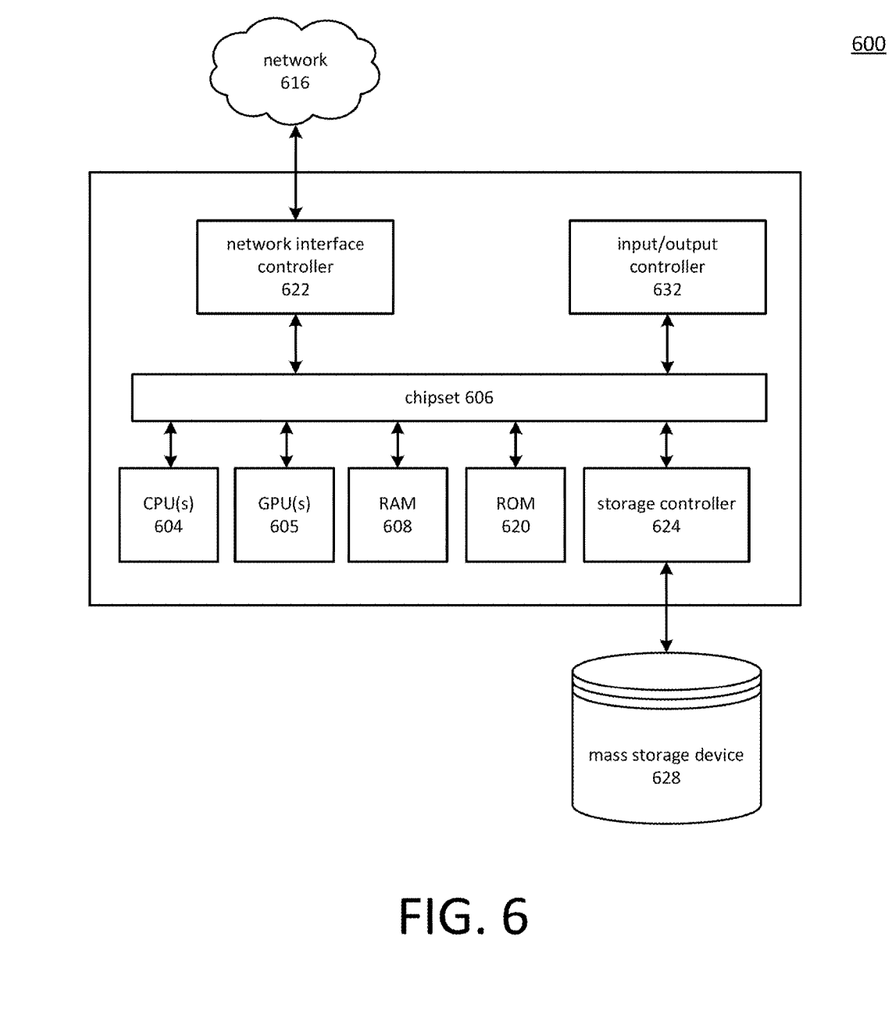
FIG. 6 depicts an example computing device that may be used in various aspects, such as the servers, modules, and/or devices described herein.

FIG. 6 depicts a computing device 600 that may be used in various aspects, such as the servers, modules, and/or devices depicted in FIG. 1. With regard to the example architecture of FIG. 1, the computing device 104, input device 128, and/or the server 102 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIG. 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example

The invention claimed is:

1. A method comprising:
   training, based on historical user input data, a machine learning model to determine patterns associated with voice commands;
   receiving a voice input indicating data associated with a first portion of a command;
   predicting, based on the first portion and while the voice input is being received, and based on the machine learning model, a second portion of the command; and
   causing execution of the command, based on the first portion and the predicted second portion, prior to an end of the voice input.

2. The method of claim 1, further comprising:
   storing the predicted second portion; and
   re-training, based on the stored predicted second portion, the machine learning model.

3. The method of claim 1, further comprising:
   storing second data indicative of a complete voice input; and
   determining, based on the stored second data, that the predicted second portion is incorrect; and
   causing execution of a second command that is associated with the complete voice input.

4. The method of claim 1, wherein the predicting second portion is further based on at least one of:
   one or more common input commands,
   metadata,
   time information,
   location information,
   demographic information, or
   differences between a format of the voice input and formats of previous inputs and changes in acoustic features.

5. The method of claim 1, wherein the machine learning model is configured to learn relationships between actions and entities with temporal dependencies.

6. The method of claim 1, wherein the machine learning model is configured to predict whether the command is complete and additional words that a user may speak.

7. The method of claim 1, wherein the machine learning model is configured to determine whether an end of the command has been reached based on detecting a silence cue.

8. The method of claim 1, wherein the machine learning model comprises a long short term memory (LSTM) network.

9. A device, comprising:
   one or more processors; and
   memory storing instructions that, when executed by the one or more processors, cause the device to:
      train, based on historical user input data, a machine learning model to determine patterns associated with voice commands;
      receive a voice input indicating data associated with a first portion of a command;
      predict, based on the first portion and while the voice input is being received, and based on the machine learning model, a second portion of the command; and
      cause execution of the command, based on the first portion and the predicted second portion, prior to an end of the voice input.

10. The device of claim 9, wherein the instructions, when executed by the one or more processors, further cause the device to:
    store the predicted second portion; and
    re-train, based on the stored predicted second portion, the machine learning model.

11. The device of claim 9, wherein the instructions, when executed by the one or more processors, further cause the device to:
    store second data indicative of a complete voice input; and
    determine, based on the stored second data, that the predicted second portion is incorrect; and
    cause execution of a second command that is associated with the complete voice input.

12. The device of claim 9, wherein the predicting second portion is further based on at least one of:
    one or more common input commands,
    metadata,
    time information,
    location information,
    demographic information, or
    differences between a format of the voice input and formats of previous inputs and changes in acoustic features.

13. The device of claim 9, wherein the machine learning model is configured to learn relationships between actions and entities with temporal dependencies.

14. The device of claim 9, wherein the machine learning model is configured to predict whether the command is complete and additional words that a user may speak.

15. The device of claim 9, wherein the machine learning model is configured to determine whether an end of the command has been reached based on detecting a silence cue.

16. The device of claim 9, wherein the machine learning model comprises a long short term memory (LSTM) network.

17. A non-transitory computer-readable medium storing instructions that, when executed, cause:
    training, based on historical user input data, a machine learning model to determine patterns associated with voice commands;
    receiving a voice input indicating data associated with a first portion of a command;
    predicting, based on the first portion and while the voice input is being received, and based on the machine learning model, a second portion of the command; and
    causing execution of the command, based on the first portion and the predicted second portion, prior to an end of the voice input.

18. The non-transitory computer-readable medium of claim 17, wherein the predicting second portion is further based on at least one of:
    one or more common input commands,
    metadata,
    time information,
    location information,
    demographic information, or
    differences between a format of the voice input and formats of previous inputs and changes in acoustic features.

19. The non-transitory computer-readable medium of claim 17, wherein the machine learning model is configured to:
    learn relationships between actions and entities with temporal dependencies,
    predict whether the command is complete and additional words that a user may speak, or
    determine whether an end of the command has been reached based on detecting a silence cue.

20. The non-transitory computer-readable medium of claim 17, wherein the machine learning model comprises a long short term memory (LSTM) network.

\* \* \* \* \*